United States Patent
You et al.

(10) Patent No.: US 10,338,300 B2
(45) Date of Patent: Jul. 2, 2019

(54) BACKLIGHT ASSEMBLY INCLUDING OPTICAL MEMBER GUIDING LIGHT AND CONVERTING WAVELENGTH OF LIGHT AND DISPLAY DEVICE HAVING THE SAME

(71) Applicant: Samsung Display Co., Ltd., Yongin-Si, Gyeonggi-Do (KR)

(72) Inventors: Junwoo You, Seongnam-si (KR); Donghoon Kim, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 127 days.

(21) Appl. No.: 15/046,633

(22) Filed: Feb. 18, 2016

(65) Prior Publication Data
US 2016/0363708 A1    Dec. 15, 2016

(30) Foreign Application Priority Data
Jun. 11, 2015    (KR) .................. 10-2015-0082752

(51) Int. Cl.
*F21V 8/00*    (2006.01)
(52) U.S. Cl.
CPC ........... *G02B 6/005* (2013.01); *G02B 6/0053* (2013.01); *G02B 6/0055* (2013.01)
(58) Field of Classification Search
CPC ................. G02B 6/005; G02B 6/0055
See application file for complete search history.

(56) References Cited

U.S. PATENT DOCUMENTS

| | | | | |
|---|---|---|---|---|
| 8,040,052 B2 * | 10/2011 | Kobayashi | ......... | H01L 27/3213 313/504 |
| 2010/0141116 A1 * | 6/2010 | Nomura | ........... | B29D 11/00634 313/498 |
| 2011/0110104 A1 * | 5/2011 | Kim | ....................... | G02B 5/045 362/341 |
| 2012/0113671 A1 | 5/2012 | Sadasivan et al. | | |
| 2013/0100144 A1 * | 4/2013 | Rao | ....................... | G02B 6/0038 345/501 |
| 2013/0264590 A1 * | 10/2013 | Oh | ......................... | H01L 33/08 257/88 |

(Continued)

FOREIGN PATENT DOCUMENTS

| | | |
|---|---|---|
| KR | 10-0773993 B1 | 10/2007 |
| KR | 1020110064285 A | 6/2011 |
| KR | 1020140094806 A | 7/2014 |

*Primary Examiner* — Jong-Suk (James) Lee
*Assistant Examiner* — Christopher E Dunay
(74) *Attorney, Agent, or Firm* — Cantor Colburn LLP

(57) ABSTRACT

A backlight assembly includes a light source which generates and emits light, and an optical member which is between the light source and a display panel of a display device and adjusts a path of the light emitted from the light source. The optical member includes a first base film, a second base film which faces the first base film and is closer to the display panel than the first base film, an optical pattern which is provided in plural spaced apart from each other and disposed between the first and second base films, a reflecting layer which is disposed on the optical patterns and reflects light incident to the optical member, and a wavelength conversion pattern between the first and second base films and alternately disposed with the optical patterns. The wavelength conversion pattern converts a source wavelength of the light emitted from the light source.

15 Claims, 8 Drawing Sheets

(56) References Cited

U.S. PATENT DOCUMENTS

| | | | |
|---|---|---|---|
| 2014/0036536 A1 | 2/2014 | Gettemy et al. | |
| 2014/0158982 A1* | 6/2014 | Park | G02B 6/005 |
| | | | 257/13 |
| 2015/0131314 A1* | 5/2015 | Chang | G02B 6/0096 |
| | | | 362/607 |
| 2015/0219310 A1* | 8/2015 | Lee | G02F 1/0105 |
| | | | 362/84 |
| 2015/0277017 A1* | 10/2015 | Aoyagi | H01L 51/5271 |
| | | | 362/608 |
| 2016/0085118 A1* | 3/2016 | Lee | G02F 1/133512 |
| | | | 349/62 |
| 2016/0103262 A1* | 4/2016 | Kashiwagi | G02B 6/005 |
| | | | 362/607 |
| 2016/0147007 A1* | 5/2016 | Hong | G02B 6/0055 |
| | | | 345/520 |
| 2016/0154162 A1* | 6/2016 | Cheng | G02B 6/0043 |
| | | | 362/607 |
| 2016/0187564 A1* | 6/2016 | Kim | G02B 6/0046 |
| | | | 362/607 |
| 2016/0329020 A1* | 11/2016 | Ma | F21V 7/0025 |
| 2017/0023728 A1* | 1/2017 | Choi | G02F 1/133615 |
| 2017/0139101 A1* | 5/2017 | Lee | G02B 6/005 |
| 2017/0242183 A1* | 8/2017 | Song | G02F 1/133617 |
| 2017/0277002 A1* | 9/2017 | Yamada | G02F 1/133621 |
| 2017/0293169 A1* | 10/2017 | Braun | G02F 1/1336 |

* cited by examiner

BACKLIGHT ASSEMBLY INCLUDING OPTICAL MEMBER GUIDING LIGHT AND CONVERTING WAVELENGTH OF LIGHT AND DISPLAY DEVICE HAVING THE SAME

This application claims priority to Korean Patent Application No. 10-2015-0082752, filed on Jun. 11, 2015, and all the benefits accruing therefrom under 35 U.S.C. § 119, the entire contents of which are hereby incorporated by reference.

BACKGROUND (1) Field

The invention disclosed herein relates to a display device, and more particularly, to a display device which displays an image by using light output from a backlight assembly.

(2) Description of the Related Art

Display devices like liquid crystal displays include a backlight assembly, and a display panel which displays images by using the light output from the backlight assembly. The backlight assembly may include a light emitting unit which generates light, a light guide panel which guides the light generated from the light emitting unit toward the display panel, and optical sheets which control a path of the light emitted from the light guide panel.

A diffusion sheet and a prism sheet may be examples of the optical sheets. The diffusion sheet diffuses the light emitted from the light guide panel. Accordingly, the brightness of the display device may be made uniform by the diffusion sheet.

The prism sheet refracts obliquely-incident light to the prism sheet to become closer to a direction perpendicular to the prism sheet. Accordingly, the brightness in a front surface direction of the display device may be enhanced by the prism sheet.

SUMMARY

One or more exemplary embodiment provides a display device having enhanced display quality.

An exemplary embodiment of the invention provides a display device including a backlight assembly which generates light, and a display panel which receives the light from the backlight assembly to display an image. The backlight assembly includes a light source which generates and emits the light, and an optical member which is between the light source and the display panel and adjusts a path of the light emitted from the light source.

In an exemplary embodiment, the optical member includes a first base film, a second base film, an optical pattern, a reflecting layer and a wavelength conversion pattern. The second base film faces the first base film and is disposed closer to the display panel than the first base film. The optical pattern is provided in plural spaced apart from each other between the first and second base films. The reflecting layer is disposed on the optical patterns. The wavelength conversion pattern is provided in plural between the first and second base films and alternates with the optical patterns. The wavelength conversion pattern converts a source wavelength of the light emitted from the light source.

In an exemplary embodiment of the invention, another display device includes a backlight assembly which generates light, and a display panel which receives the light from the backlight assembly to display an image. The backlight assembly includes a light source which generates and emits the light, and an optical member which is disposed between the light source and the display panel and adjusts a path of the light emitted from the light source.

In an exemplary embodiment, the optical member includes a base film, an optical pattern, a reflecting layer, a wavelength conversion pattern and a cover pattern. The optical pattern is provided in plural spaced apart from each other on the base film, and the reflecting layer is disposed on the optical patterns and reflects light incident to the optical member. The wavelength conversion pattern is provided in plural on the base film and alternately disposed with the optical patterns. The wavelength conversion pattern converts a source wavelength of the light emitted from the light source. The cover pattern covers the wavelength conversion pattern and exposes the optical pattern to outside the optical member.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
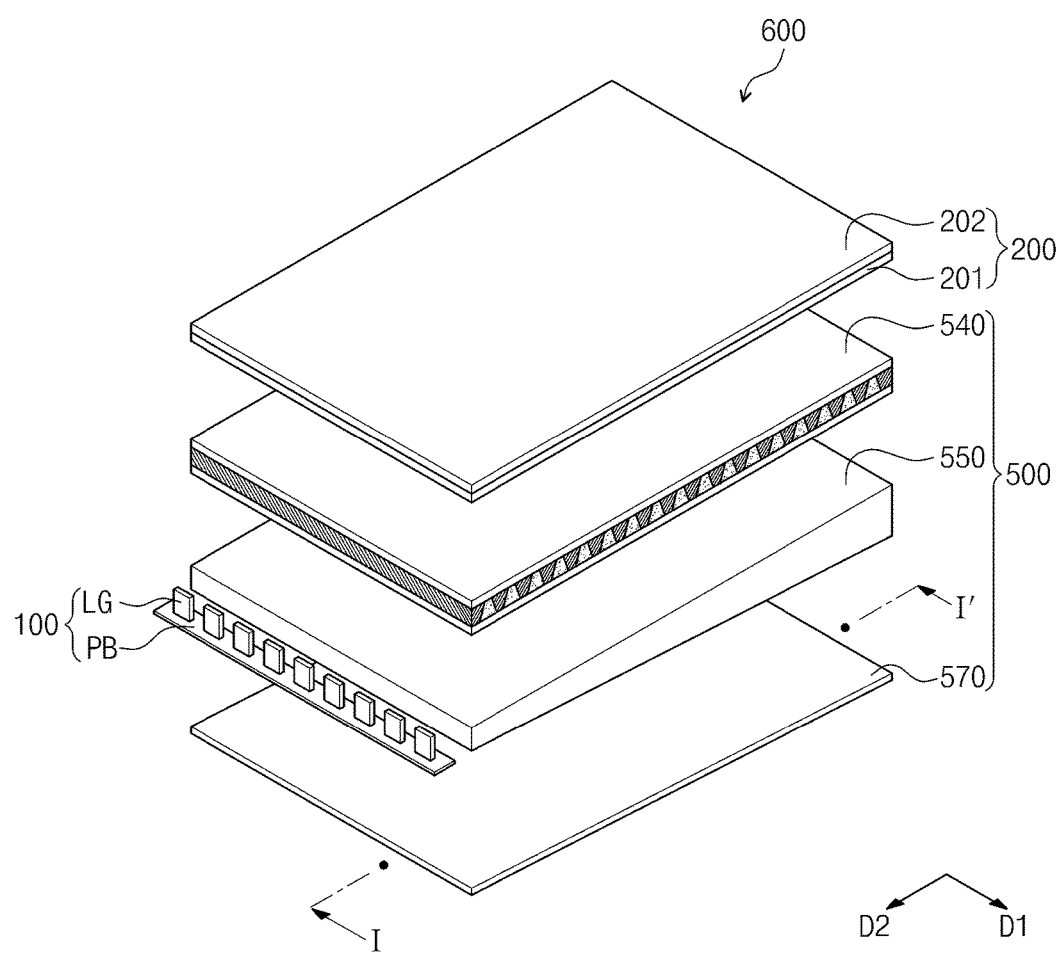
FIG. 1 is an exploded perspective view of an exemplary embodiment of a display device according to the invention.

Hereinafter, exemplary embodiments of the invention will be described in detail with reference to the accompanying drawings. The features and advantages of the invention concept will be understood without difficulties through exemplary embodiments described below related to the accompanying drawings. The invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art. Accordingly, the scope of the present disclosure should not be construed as limited to the exemplary embodiments set forth herein. Like reference numerals in the following embodiments and drawings denote like elements.

Also, in the following description, terms, such as "first" and "second" are not used for limitation but for distinguishing one component from another component.

Also, it will be understood that when a film, a region, a component, etc. is referred to as being 'over' or "on" another layer, region, or plate, it can be directly on the other layer, region, or plate, or intervening layers, regions, or plates may also be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
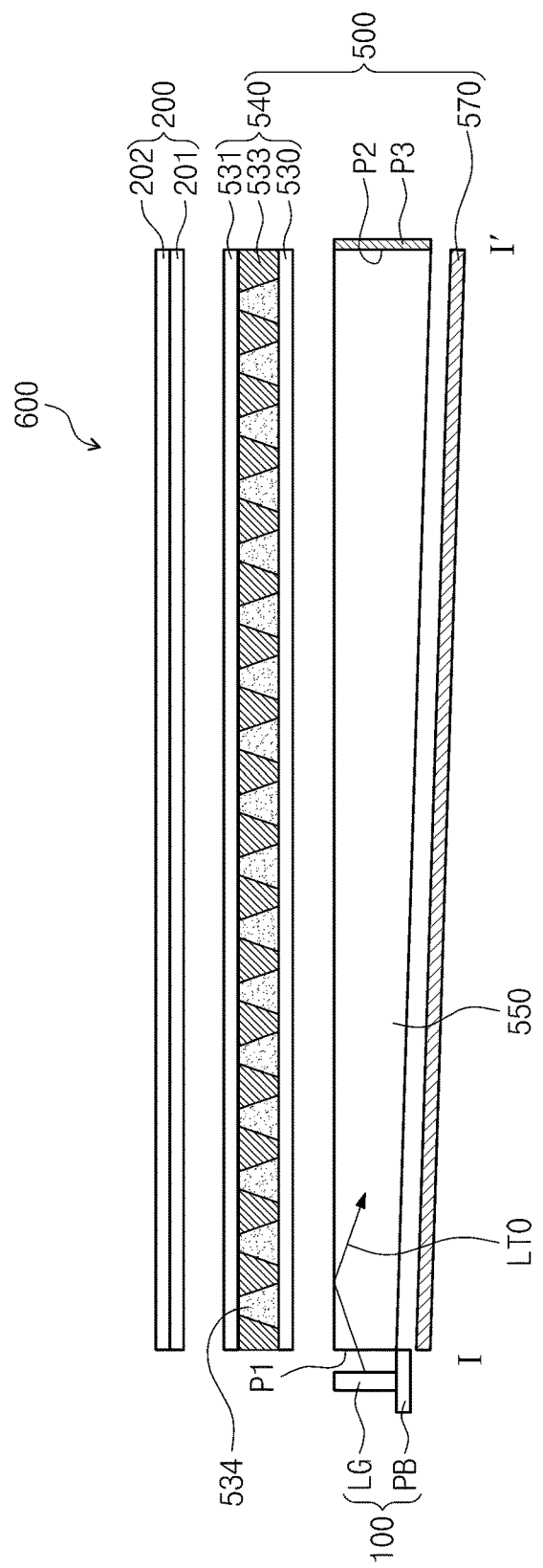
FIG. 2 is a cross-sectional view of the display device taken along line I-I' of FIG. 1.

FIG. 1 is an exploded perspective view of an exemplary embodiment of a display device 600 according to the invention, and FIG. 2 is a cross-sectional view of the display device taken along line I-I' of FIG. 1.

Referring to FIGS. 1 and 2, the display device 600 includes a display panel 200 and a backlight assembly 500.

The display panel 200 displays an image using light generated by and output from the backlight assembly 500. In the exemplary embodiment, the display panel 200 may include a display substrate 201, a facing substrate 202, and a liquid crystal layer (not shown) interposed between the display substrate 201 and the facing substrate 202.

The display substrate 201 may include a plurality of pixel electrodes (not shown) disposed in a plurality of pixel regions, on a first base substrate, and the facing substrate 202 may include a common electrode (not shown) on a second base substrate and facing the plurality of pixel electrodes. However, the invention is not limited to the above-described configurations of the display substrate 201 and the facing substrate 202. In another exemplary embodiment, for example, the display substrate 201 may include not only the plurality of pixel electrodes but also the common electrode such that the common electrode is not provided in the facing substrate 202.

In the exemplary embodiment, the backlight assembly 500 includes a light emitting unit 100, a reflective member 570, a light guide member 550 and an optical member 540. In the exemplary embodiment illustrated in FIG. 2, the optical member 540 may be disposed spaced apart from the light guide member 550, and the reflecting member 570 may be spaced apart from the light guide member 550, but the invention is not limited thereto.

The light emitting unit 100 includes a driving circuit board PB and a light source LG which is provided in plural mounted on the driving circuit board PB. The plurality of light sources LG receives power from the driving circuit board PB and generates a source light LT0. Also, a length of the light emitting unit 100 is extended in a first direction D1 along a side surface of the light guide member 550. Accordingly, the source light LT0 is incident to the light guide member 550 through the side surface of the light guide member 550.

In the exemplary embodiment, each of the plurality of light sources LG may be a light emitting diode package. A light emitting surface of each of the plurality of light sources LG may face the light guide member 550, such as facing a side surface of the light guide member 550 through which the source light LT0 is incident.

The reflective member 570 has a light reflecting property, and the light guide member 550 is disposed over the reflective member 570. The reflective member 570 reflects the light emitted from the light guide member 550, such as through a rear surface thereof, and the light reflected by the reflective member 570 may be re-directed to be incident again toward the light guide member 550.

In the exemplary embodiment, the reflective member 570 may have a sheet shape with a cross-sectional thickness from about several micrometers to about several hundred micrometers. In another exemplary embodiment, a bottom surface of the light guide member 550 may contact the reflective member 570 or may define the reflective member 570 such as by having a reflective material disposed thereon.

The light guide member 550 includes a light incident portion P1 thereof, a light facing portion P2 thereof, and a light reflecting portion P3 thereof. The source light LT0 may be incident to the light guide member 550 through the light incident portion P1, the incident source light LT0 proceeds within the light guide member 550 and toward the light facing portion P2 thereof, and the source light LT0 reaching the light facing portion P2 may be reflected by the light reflecting portion P3. A light emitting surface of the light guide member 550 faces the display panel 200 and the rear surface of the light guide member 550 is disposed opposing the light emitting surface thereof. Side surfaces of the light guide member 550 connect the light emitting and rear surfaces to each other. The light guide member 550 defines the above-described surfaces thereof. The light incident portion P1, the light facing portion P2 and the light reflecting portion P3 of the light guide member 550 may be defined by side surfaces thereof.

In the exemplary embodiment, the light guide member 550 may be a plate having a wedge shape. While the light guide member 550 is described as a plate, such as having a relatively large cross-sectional thickness for ease of description, the invention is not limited thereto. Accordingly, a cross-sectional thickness of the light guide member 550 becomes smaller in a direction from the light facing portion P2 toward the light incident portion P1, and becomes greater in a direction from the light incident portion P1 toward the light facing portion P2.

When the source light LT0 incident to the light guide member 550 proceeds within the light guide member 550 toward the light incident portion P1 after being reflected by the light reflecting portion P3, a reflection angle of the source light LT0 inside the light guide member 550 may vary because the cross-sectional thickness of the light guide member 550 varies in a direction between the light incident portion P1 and the light facing portion P2. When the reflection angle of the source light LT0 within the light guide member 550 becomes smaller than a critical angle which generates a total reflection, the source light LT0 may be output from the light guide member 550 through the light emitting surface thereof and provided toward the optical member 540.

Figure 3A:
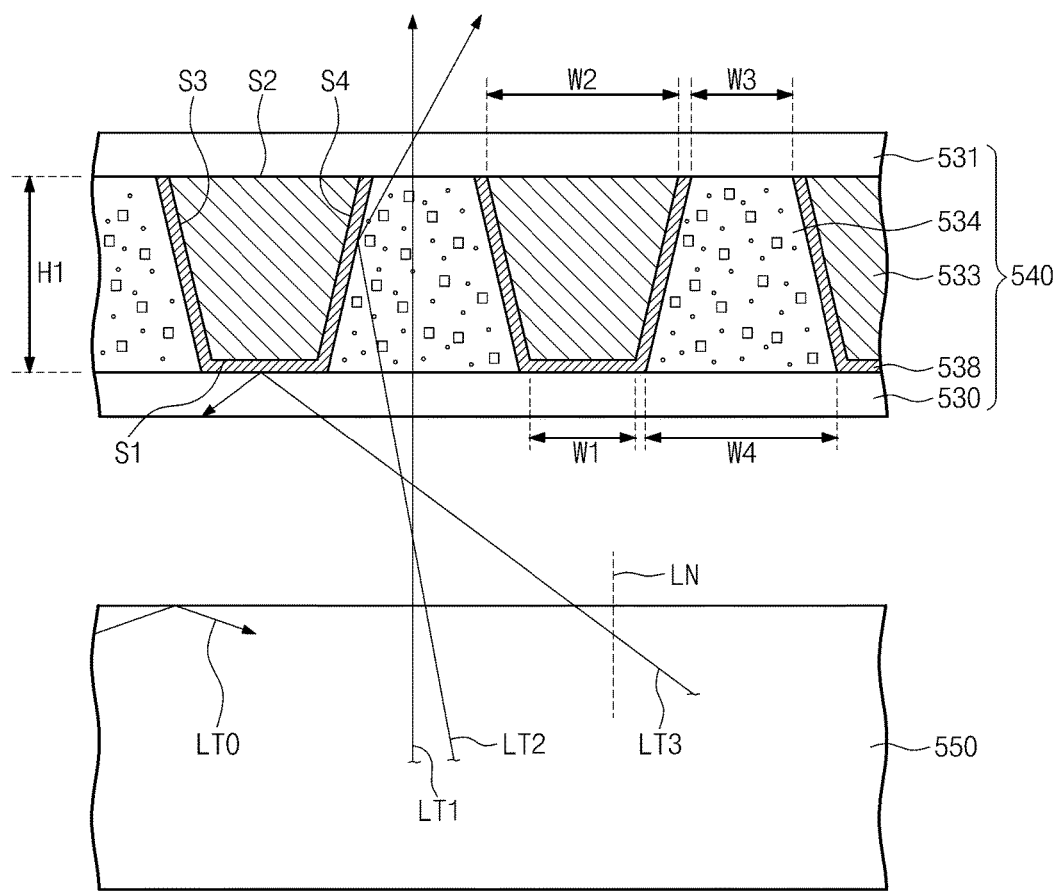
FIG. 3A is an enlarged view illustrating a portion of an exemplary embodiment of an optical member illustrated in FIG. 2.
Figure 3B:
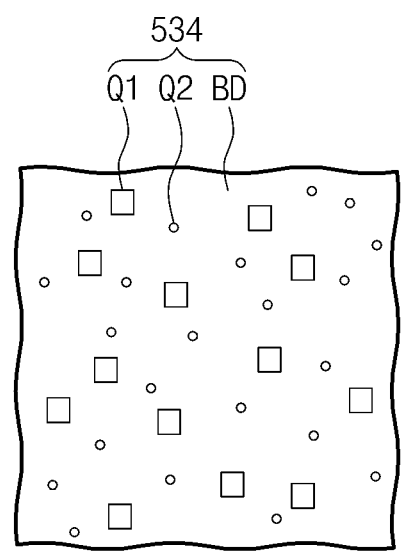
FIG. 3B is an enlarged view illustrating an exemplary embodiment of a wavelength conversion pattern illustrated in FIG. 3A.

The optical member 540 is disposed between the light guide member 550 and the display panel 200, and a path of light passing between the light guide member 550 and the display panel 200 is adjusted by the optical member 540. In the exemplary embodiment, the optical member 540 may have a sheet shape or a film shape, and in another exemplary embodiment, the optical member 540 may have a plate shape. Referring to FIGS. 3A and 3B, the structure and the function of the optical member 540 will be specifically described as follows.

FIG. 3A is an enlarged view illustrating a portion of an exemplary embodiment of an optical member 540 illustrated in FIG. 2, and FIG. 3B is an enlarged view illustrating an exemplary embodiment of a wavelength conversion pattern 534 illustrated in FIG. 3A.

Referring to FIGS. 1, 3A and 3B, the optical member 540 includes a first base film 530, a second base film 531, an optical pattern 533 provided in plural to define an optical pattern layer, a reflecting layer 538, and a wavelength conversion pattern 534 provided in plural to define a wavelength conversion pattern layer. The plural optical patterns 533, the reflecting layer 538 and the plural wavelength conversion patterns 534 may define an entire of the layer between the first and second base films 530 and 531.

The first and second base films 530 and 531 may be plastic films having light-transmitting properties. The first and second base films 530 and 531 face each other, with the second base film 531 closer to the display panel 200 than the first base film 530 and the first base film 530 closer to the light guide member 550 than the second base film 531.

In the exemplary embodiment, the first or second base film 530 or 531 may include a polymer, such as polyethylene terephthalate ("PET"), polymethyl methacrylate ("PMMA") and polycarbonate ("PC").

The plurality of optical patterns 533 may be disposed between the first and second base films 530 and 531 and spaced apart from each other. The plurality of optical patterns 533 may contact one or both of the first and second base films 530 and 531.

As illustrated in FIG. 1, in the exemplary embodiment, lengths of the plurality of optical patters 533 may respectively extend in the first direction D1, and the plurality of optical pattern layers 533 may be arranged spaced apart from each other in a second direction D2 perpendicular to the first direction D1.

In the exemplary embodiment, the plurality of optical patterns 533 may include a light-absorbing material. In an exemplary embodiment, for example, the plurality of optical patterns 533 may include a polymer including black dye or pigment, or carbon. Accordingly, among portions of the source light LT0, a portion which may not be reflected by the reflection layer 538 and transmitted through the reflection layer 538 may be absorbed by the plurality of optical patterns 533.

A structure of one optical pattern 533 among the plural optical patterns 533 will be described as follows as an example. The optical pattern 533 defines a lower surface S1 thereof, an upper surface S2 thereof, a first side surface S3 thereof and a second side surface S4 thereof. The lower surface S1 contacts the first base film 530, the upper surface S2 contacts the second base film 531, and each of the first and second side surfaces S3 and S4 connects the lower surface S1 to the upper surface S2.

In the exemplary embodiment, the optical pattern 533 may have a tapered shape. Accordingly, a second direction DR2 width of the optical pattern 533 in a cross-section becomes smaller in a direction from the upper surface S2 thereof toward the first base film 530. More specifically, the lower surface S1 has a first width W1 in a cross section. When the upper surface S2 has a second width W2 in a cross section, the upper surface S2 overlaps the lower surface S1 in the top plan view since the second width W2 is greater than the first width W1.

The first side surface S3 faces the second side surface S4, and each of the first and second side surfaces S3 and S4 is inclined with respect to each of the lower surface S1 and the upper surface S2. Accordingly, the optical pattern 533 may have a trapezoidal shape in a cross-section.

The reflecting layer 538 is disposed on a surface of the optical pattern 533. More specifically, the reflecting layer 538 is disposed on the lower surface S1, the first side surface S3 and the second side surface S4 of the optical pattern 533.

In the exemplary embodiment, the reflecting layer 538 may include a metal material. In an exemplary embodiment, for example, the reflecting layer 538 may include silver (Ag) or aluminum (Al).

A structure of one wavelength conversion pattern 534 among the plurality of wavelength conversion patterns 534 will be described as follows. The wavelength conversion pattern 534 is disposed between the first and second base films 530 and 531. The wavelength conversion pattern 534 is disposed between two optical patterns 533 adjacent to each other in the second direction D2 from among the plurality of optical patterns 533. Lengths of the plurality of wavelength conversion patterns 534 may respectively extend in the first direction D1, and the plurality of wavelength conversion patterns 534 may be arranged spaced apart from each other in the second direction D2 perpendicular to the first direction D1.

Accordingly, the wavelength conversion pattern 534 may have a tapered shape which is the reverse of the tapered shape of the optical pattern 533. More specifically, a width of the wavelength conversion pattern 534 in a cross-section becomes smaller in a direction from the first base film 530 toward the second film 531. An upper surface of the wavelength conversion pattern 534 contacting the second base film 531 has a third width W3, a lower surface of the wavelength conversion pattern 534 contacting the first base film 530 has a fourth width W4, and the fourth width W4 is greater than the third width W3.

In the exemplary embodiment, the wavelength conversion pattern 534 includes a binder BD, a first wavelength conversion member Q1 provided in plural and a second wavelength conversion member Q2 provided in plural. The first and second wavelength conversion members Q1 and Q2 are dispersed in the binder BD.

In the exemplary embodiment, each of the plurality of light sources LG emits blue light, and the source light LT0 may be the blue light. Also, the first wavelength conversion members Q1 may include a quantum dot which absorbs the blue light and emits red light, and the second wavelength conversion members Q2 may include a quantum dot which absorbs the blue light and emits green light. Accordingly, among the source light LT0, a portion of the blue light having a wavelength which is not converted by the wavelength conversion pattern 534 may be mixed with the green light and the red light to realize white light.

In the exemplary embodiment, the wavelength conversion pattern 534 includes first and second wavelength conversion members Q1 and Q2, but the invention is not limited thereto. In another exemplary embodiment, the wavelength conversion pattern 534 may include only one type of quantum dot. In an exemplary embodiment, for example, the wavelength pattern 534 may include only quantum dots converting the blue light into a yellow light. Where the wavelength pattern 534 includes only quantum dots converting the blue light into a yellow light, among the source light LT0, the blue light having a wavelength which is not converted by the wavelength conversion pattern 534 is mixed with the yellow light and white light may be realized.

Optical functions of the optical member 540 having the above-described structure are as follows. The optical member 540 collects the source light LT0 emitted from the light emitting unit 100, and changes a direction of the emitted source light LT0 to become closer to a direction of a normal line LN of the optical member 540.

More specifically, since the source light LT0 incident to the optical pattern 533 and the reflecting layer 538 is absorbed or reflected, the source light LT0 may be emitted from the optical member 540 only through the wavelength conversion pattern 534. Since the width of the wavelength conversion pattern 534 is reduced in a direction toward the second base film 531, first and second source lights LT1 and LT2 incident to the wavelength conversion pattern 534 have proceeding directions closer to the direction of the normal line NL and may be emitted from the optical member 540.

As a proceeding direction of the light emitted from the optical member 540 gets closer to the direction of the normal line NL, the brightness in a front surface direction of the display panel (200 in FIG. 2) may be enhanced because an amount of the light emitted at the front surface of the display panel is increased.

Also, as a value defined by the third width W3 divided by the fourth width W4 becomes smaller, or as a cross-sectional height H1 of the wavelength conversion pattern 534 is increased, the brightness in the front surface direction of the display panel 200 may become greater.

When a third incident light LT3 having an incident angle greater than those of the first or second source light LT1 or LT2 is incident to the wavelength conversion pattern 534, the third incident light LT3 is reflected a plurality of times at the reflecting layer 538 disposed on the first and second side surfaces S3 and S4 of the optical pattern 533, and the proceeding direction of the third incident light LT3 may become closer to the direction of the normal line LN.

When the third source light LT3 is reflected by the reflecting layer 538 disposed on the lower surface S1 of the optical pattern 533, the third source light LT3 is further reflected by a reflecting member (570 in FIG. 2) and incident again to the light guide member 550. Also, while the third source light LT3 is reflected by both the reflecting layer 538 and the reflecting member, the proceeding direction of the third source light LT3 may become more random. Accordingly, the proceeding direction of the third source light LT3 may be converted to be closer to the normal line direction NL, and the third source light LT3 closer to the normal line NL may improve the brightness at the front surface of the display panel 200.

Figure 4:
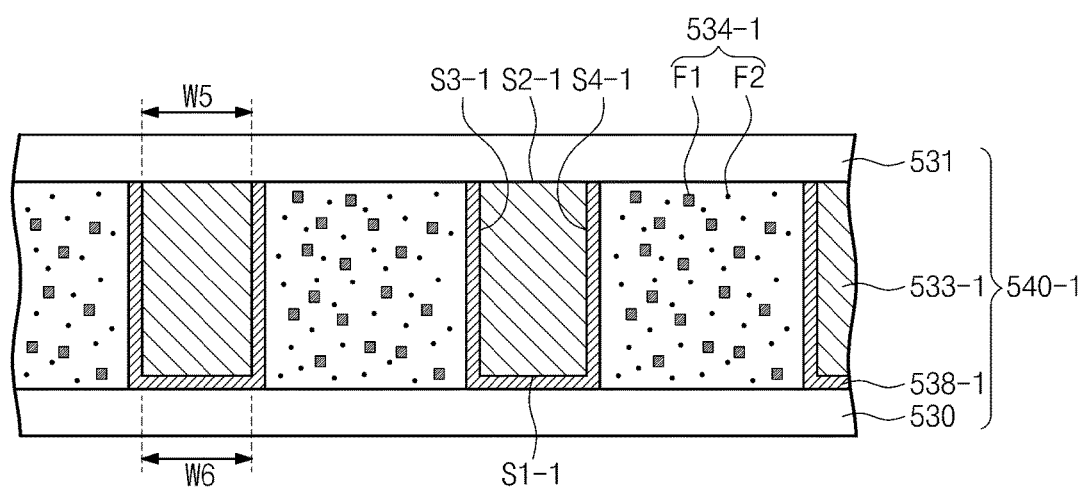
FIG. 4 is a cross-sectional view illustrating another exemplary embodiment of an optical member according to the invention.
Figure 4:
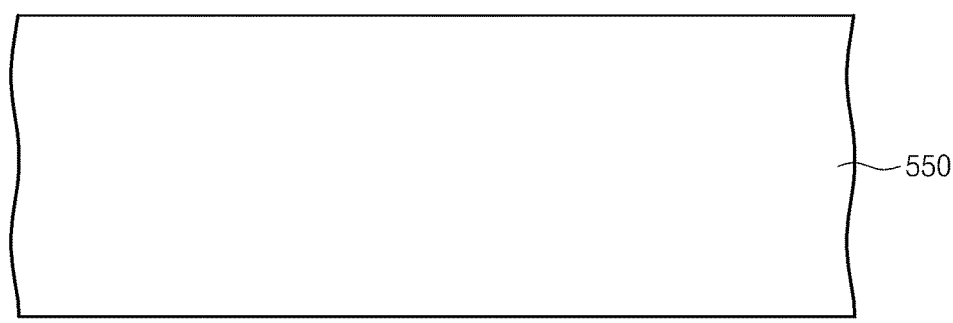

FIG. 4 is a cross-sectional view illustrating another exemplary embodiment of an optical member 540-1 according to the invention. In describing FIG. 4, previously described components will be designated by the same reference numerals, and overlapping descriptions thereof will not be provided.

Referring to FIG. 4, the optical member 540-1 includes a first base film 530, a second base film 531, an optical pattern 533-1 provided in plural to define an optical pattern layer, a reflecting layer 538-1, and a wavelength conversion pattern 534-1 provided in plural to define a wavelength conversion pattern layer. The plural optical patterns 533-1, the reflecting layer 538 and the plural wavelength conversion patterns 534-1 may define an entire of the layer between the first and second base films 530 and 531.

Each of an optical pattern 533-1 among the plural optical patterns 533-1 defines a lower surface S1-1 thereof, an upper surface S2-1 thereof, a first side surface S3-1 thereof and a second side surface S4-1 thereof. The lower surface S1-1 contacts the first base film 530, the upper surface S2-1 contacts the second base film 531, and each of the first and second side surfaces S3-1 and S4-1 connects the lower surface S1-1 to the upper surface S2-1.

In the exemplary embodiment, a fifth width W5 of the upper surface S2-1 may be the same as a sixth width W6 of the lower surface S1-1. Accordingly, each of the first and second side surfaces S3-1 and S4-1 may be substantially perpendicular to each of the lower surface S1-1 and the upper surface S2-1.

As described above, when each of the plurality of optical patterns 533-1 has a rectangular shape in a cross-section, each of the plurality of wavelength conversion patterns 534-1 alternately arranged with the plurality of optical patterns 533-1 in the second direction D2 may have a rectangular shape in a cross-section. Also, in the exemplary embodiment of FIG. 4, like the exemplary embodiment described above with reference to FIGS. 3A and 3B, an effect in which the brightness at a front surface of the display panel is improved may be attained.

Also, in the exemplary embodiment illustrated in FIG. 4, the wavelength conversion pattern 534-1 may include a first wavelength conversion member F1 provided in plural and a second wavelength conversion member F2 provided in plural. The first and second wavelength conversion members F1 and F2 may be phosphors. In an exemplary embodiment, for example, when the plurality of light sources (LG in FIG. 1) emits blue light, the first wavelength conversion members F1 may be phosphors which absorb the blue light and emit red light, and the second wavelength conversion members F2 may be phosphors which absorb the blue light and emit green light. Accordingly, a portion of the blue light which is emitted from the plurality of light sources LG and has a wavelength which is not converted by the wavelength conversion pattern 534-1 may be mixed with the green light and the red light to realize white light.

In the exemplary embodiment, the wavelength conversion pattern 534-1 includes first and second wavelength conversion members F1 and F2, but the invention is not limited thereto. In another exemplary embodiment, the wavelength conversion pattern 534-1 may include only one type of phosphor. In an exemplary embodiment, for example, the wavelength conversion pattern 534-1 may include only phosphors converting the blue light into yellow light. Where the wavelength conversion pattern 534-1 includes only phosphors converting the blue light into yellow light, a portion of the blue light which is emitted from the plurality of light sources and has a wavelength which is not converted by the wavelength conversion pattern 534-1 is mixed with the yellow light and white light may be realized.

Figure 5:
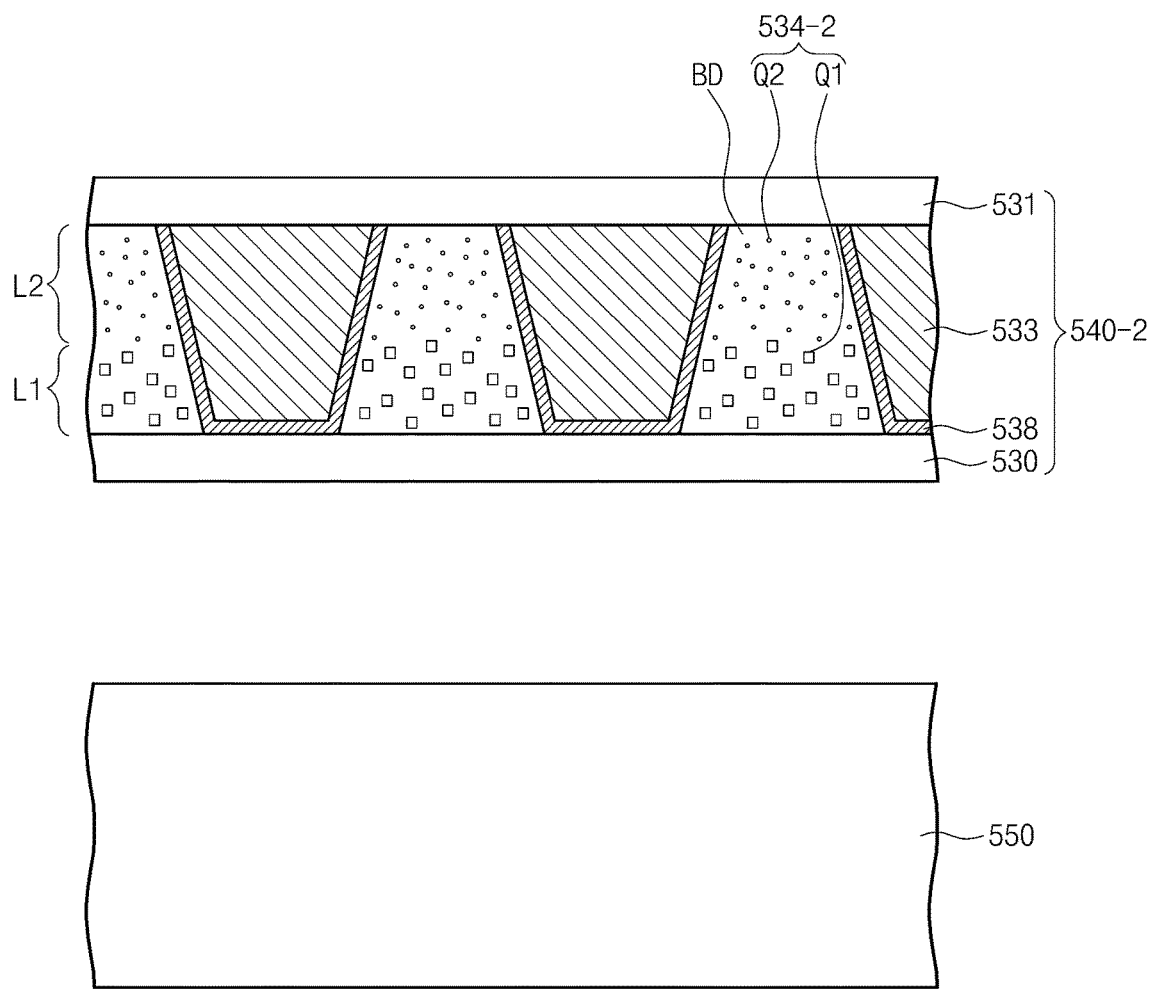
FIG. 5 is a cross-sectional view illustrating still another exemplary embodiment of an optical member according to the invention.

FIG. 5 is a cross-sectional view illustrating still another exemplary embodiment of an optical member 540-2 according to the invention. In describing FIG. 5, previously described components will be designated by the same reference numerals, and overlapping descriptions thereof will not be provided.

Referring to FIG. 5, the optical member 540-2 includes a first base film 530, a second base film 531, an optical pattern 533 provided in plural to define an optical pattern layer, a reflecting layer 538, and a wavelength conversion pattern 534-2 provided in plural to define a wavelength conversion pattern layer. The plural optical patterns 531, the reflecting layer 538 and the plural wavelength conversion patterns 534-2 may define an entire of the layer between the first and second base films 530 and 531.

In the exemplary embodiment illustrated in FIGS. 3A and 3B, in comparison with the embodiment illustrated in FIG. 5, the first wavelength conversion members (Q1 in FIG. 3B) and the second wavelength conversion members (Q2 in FIG. 3B) are disorderedly disposed in the binder (BD in FIG. 3B) of the wavelength conversion patterns (534 in FIG. 3B). However, in the exemplary embodiment illustrated in FIG. 5, the first and second wavelength conversion members Q1 and Q2 each provided in plural respectively define layers of wavelength conversion members separated from each other in a binder BD.

More specifically, in the binder BD, a first layer L1 defined by the first wavelength conversion members Q1 and a second layer L2 defined by the second wavelength conversion members Q2 are sequentially disposed. The first layer L1 is disposed closer to the first base film 530 than the second layer L2, and the second layer L2 is disposed closer to the second base film 531 than the first layer L1.

As described above, when the first and second wavelength conversion members Q1 and Q2 are respectively grouped, in the binder BD, to define stratified first and second layers L1 and L2, re-absorption of the light absorbed by the second wavelength conversion members Q2 and having a converted wavelength thereof by the first wavelength conversion members Q1 may be reduced or effectively prevented. Accordingly, the efficiency in which the blue light generated from the plurality of light sources (LG in FIG. 1) is converted into white light by the wavelength conversion patterns 534-2 may be improved, and the purity of the white light output from the optical member 540-2 may be improved.

Figure 6:
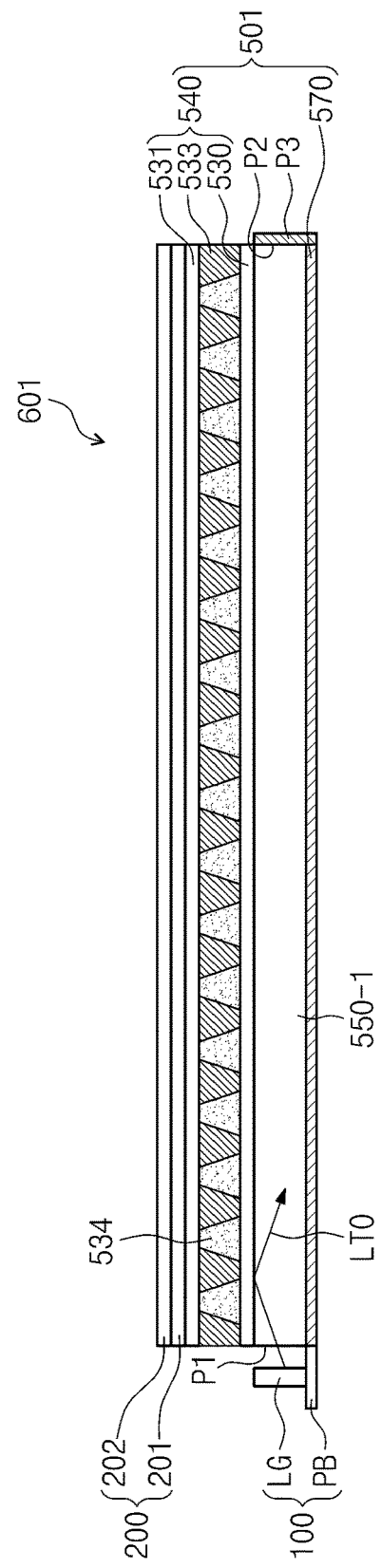
FIG. 6 is a cross-sectional view of another exemplary embodiment of a display device according to the invention.

FIG. 6 is a cross-sectional view of another exemplary embodiment of a display device 601 according to the invention. In describing FIG. 6, previously described components will be designated by the same reference numerals, and overlapping descriptions thereof will not be provided.

Referring to FIG. 6, the display device 601 includes a display panel 200 and a backlight assembly 501. The backlight assembly 501 includes an optical member 540, a light guide member 550-1, a light emitting unit 100 and a reflecting member 570.

In the exemplary embodiment illustrated in FIG. 6, the optical member 540 is attached to the light guide member 550-1, and the reflecting member 570 may be attached to the light guide member 550-1. Where the optical member 540 and the reflecting member 570 are attached to the light guide member 550-1, a first light transmitting attachment layer (not shown) is interposed between the optical member 540 and the light guide member 550-1, and a second attachment layer (not shown) is interposed between the reflecting member 570 and the light guide member 550-1. Accordingly, the optical member 540, the light guide member 550-1 and the reflecting member 570 may be integrated.

Also, in the exemplary embodiment described above with reference to FIG. 2, the light guide member (550 in FIG. 2) has a plate shape, the light guide member 550-1 may have a shape of a film for which the cross-sectional thickness is smaller than that of the plate and is relatively small as compared to the planar size thereof. The light guide member 550-1 having the shape of the film has a cross-sectional thickness from about several micrometers to several hundred micrometers in the exemplary embodiment illustrated in FIG. 6. Accordingly, an overall cross-sectional thickness of the backlight assembly 501 may be minimized.

Figure 7:
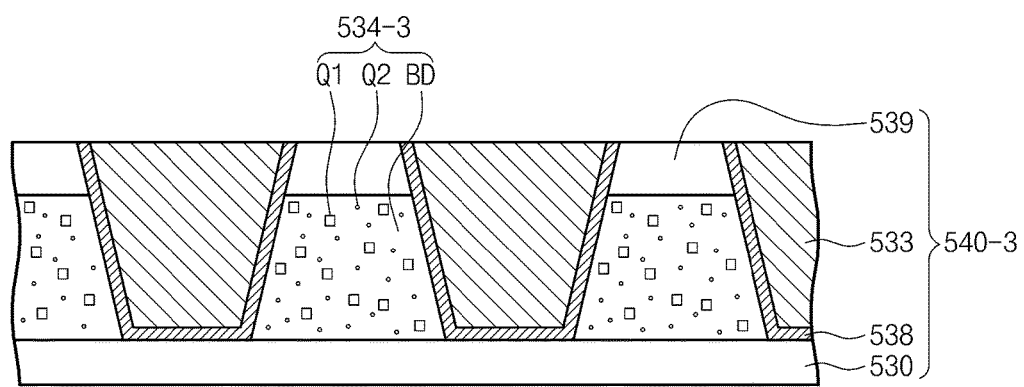
FIG. 7 is a cross-sectional view of yet another exemplary embodiment of an optical member according to the invention.
Figure 7:
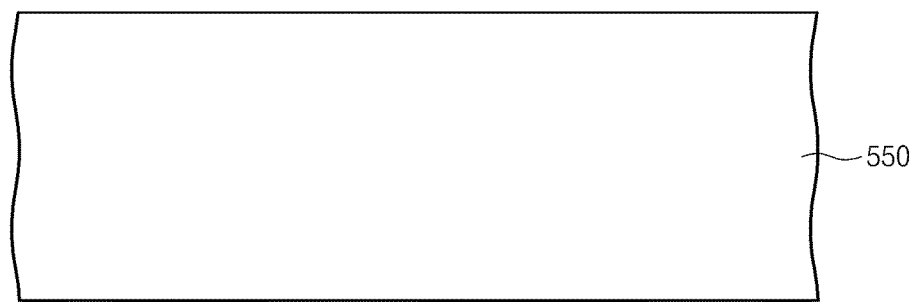

FIG. 7 is a cross-sectional view of still another exemplary embodiment of an optical member 540-3 according to the invention. In describing FIG. 7, previously described components will be designated by the same reference numerals, and overlapping descriptions thereof will not be provided.

Referring to FIG. 7, the optical member 540-3 includes a base film 530, an optical pattern 533 provided in plural to define an optical pattern layer, a reflecting layer 538, a wavelength conversion pattern 534-3 provided in plural to define a wavelength conversion pattern layer, and a cover pattern 539 provided in plural to define a cover pattern layer. The plural optical patterns 533, the reflecting layer 538, the plural wavelength conversion patterns 534-3 and the plural cover patterns 539 may define an entire of the layer between the first and second base films 530 and 531.

The plurality of optical patterns 533 is disposed spaced apart from each other on the base film 530, and the reflecting layer 538 is disposed under the plurality of optical patterns 533. The plurality of wavelength conversion patterns 534-3 are alternately disposed with the plurality of optical patterns 533 on the base film 530, and the wavelength conversion patterns 534-3 convert the wavelength of the light incident to the optical member 540-3.

The cover patterns 539 correspond one-to-one to the wavelength conversion patterns 534-3 and cover the wavelength conversion patterns 534-3. Also, since the cover patterns 539 cover the wavelength conversion patterns 534-3 from among the wavelength conversion patterns 534-3 and the optical patterns 533, the optical patterns 533 may be exposed to outside the optical member 540-3.

The cover patterns 539 may include a light-transmitting polymer, and the cover patterns 539 seal the wavelength conversion patterns 534-3 with the base film 530.

In view of an exemplary embodiment of manufacturing the optical member 540-3, the optical patterns 533 coated with the reflecting layer 538 are defined on the base film 530, and a material which is a mixture of first and second wavelength conversion members Q1 and Q2 is then filled in spaces defined between the optical patterns 533 such as by using an inkjet method. Thus, the wavelength conversion pattern layer of the wavelength conversion patterns 534-3 is defined. Thereafter, a liquid polymer is provided on the wavelength conversion patterns 534-3, and the cover patterns 539 may be defined by curing the polymer such as by using light or heat.

In the exemplary embodiment illustrated in FIG. 7, in comparison with the exemplary embodiment illustrated in FIG. 3A, a component corresponding to the second base film (531 in FIG. 3A) is not provided and omitted from the backlight unit, since the cover patterns 539 instead cover the wavelength conversion patterns 534-3. Also, in the exemplary embodiment of FIG. 7, an optical effect of the optical member (540 in FIG. 3A) described above with reference to FIGS. 3A and 3B may be attained.

According to one or more exemplary embodiment of an optical member, quantum dots are included therein, so that an optical component which changes the wavelength of light and an optical component which controls a proceeding direction of the light may be integrated into a single unit. Accordingly, an overall thickness of a backlight assembly including the integrated single unit optical member may be reduced.

Also, the color reproducibility of a display device may be improved by using the integrated single unit optical member, and the deterioration of the contrast of the display device caused by obliquely-incident light may be reduced or effectively prevented by changing the light obliquely-incident to the optical member into the light incident toward a front surface direction of the display device.

Also, according to one or more exemplary embodiment of the optical member, since quantum dots are not disposed on the entire surface of a base film but are instead positioned between the optical patterns, an amount of quantum dots used to manufacture a backlight assembly may be reduced.

It will be apparent to those skilled in the art that various modifications and variations can be made in the invention. Thus, it is intended that the invention covers the modifications and variations of this invention provided they come within the scope of the appended claims and their equivalents. Therefore, the scope of the invention is defined not by the detailed description of the invention but by the appended claims.

What is claimed is:

1. A display device, comprising:
a back light assembly which generates light; and
a display panel which is disposed on the back light assembly and receives the light generated from the back light assembly to display an image,
wherein the back light assembly comprises:
a light guide member which guides the light to the display panel, the light guide member comprising a light incident surface through which the light is incident to the light guide member;
a light source which is adjacent to the light incident surface of light guide member along a first direction and emits the light to the light guide member; and
an optical member which is between the light guide member and the display panel and adjusts a path of the light emitted from the light guide member, wherein the optical member comprises:
a first base film which defines a light incident surface of the optical member through which the light is incident to the optical member from the light guide member;
a second base film which faces the first base film and is closer to the display panel than the first base film;
an optical pattern which is provided in plural spaced apart from each other;
a reflecting layer which is disposed on the optical patterns and reflects light incident to the optical member; and
a wavelength conversion pattern which is provided in plural alternately disposed with the optical patterns, wherein the wavelength conversion pattern converts a source wavelength of the light emitted from the light source,
wherein the light incident surface of the optical member having the optical patterns, the reflecting layer and the wavelength conversion patterns is adjacent to the light guide member along a second direction orthogonal to the first direction.

2. The display device of claim 1,
wherein the optical pattern defines a lower surface thereof, and an upper surface thereof which is opposite to the lower surface and contacts the second base film, and
wherein in a direction in which the optical patterns are spaced apart from each other, a width of the upper surface is greater than that of the lower surface.

3. The display device of claim 2, wherein the optical pattern has a tapered shape in a cross-section.

4. The display device of claim 3, wherein the optical pattern further defines:
a first side surface thereof which connects the upper surface thereof to the lower surface thereof; and
a second side surface thereof which connects the upper surface thereof to the lower surface thereof and faces the first side surface,
wherein each of the first and second side surfaces is inclined with respect to each of the upper and lower surfaces.

5. The display device of claim 1,
wherein the optical pattern defines a lower surface thereof, an upper surface thereof which is opposite to the lower surface and contacts the second base film, and
wherein in a direction in which the optical patterns are spaced apart from each other, a width of the upper surface is equal to that of the lower surface.

6. The display device of claim 5, wherein the optical pattern further defines a side surface thereof which connects the upper surface to the lower surface, and the side surface is substantially perpendicular to each of the upper and lower surfaces.

7. The display device of claim 1, wherein the optical pattern comprises a material which absorbs the light emitted from the light source.

8. The display device of claim 1, wherein the wavelength conversion pattern comprises:
   a binder; and
   a wavelength conversion member provided in plural in the binder.

9. The display device of claim 8, wherein the wavelength conversion member comprises a phosphor.

10. The display device of claim 8, wherein the wavelength conversion member comprises a quantum dot.

11. The display device of claim 8, wherein the wavelength conversion member is provided in plural and comprises:
   a first wavelength conversion member which is provided in plural to define a first wavelength conversion member layer and converts the light of the source wavelength into light having a first wavelength different from the source wavelength; and
   a second wavelength conversion member which is provided in plural to define a second wavelength conversion member layer and converts the light of the source wavelength into light having a second wavelength different from the source and first wavelengths,
   wherein the first and second wavelength conversion member layers are separated from each other between the first and second base films.

12. The display device of claim 1, wherein the backlight assembly further comprises a reflecting member which is disposed facing the optical member and reflects the light reflected by the reflective layer of the optical member.

13. The display device of claim 1, wherein the light guide member faces the optical member, receives the light emitted from the light source and guides the light received from the light source toward the display panel,
   wherein the optical member is attached to the light guide member.

14. The display device of claim 13, wherein the light guide member has a film shape.

15. A display device, comprising:
   a display panel which display an image;
   a light guide member comprising an upper surface facing the display panel, a lower surface opposing the upper surface, and a plurality of side surfaces connecting the upper surface and the lower surface to each other;
   a light source facing an incident surface of the light guide member among the side surfaces thereof, along a first direction, and providing a light to the incident surface; and
   an optical member between the light guide member and the display panel, the optical member comprising:
      a first base film facing the upper surface of the light guide member and defining a light incident surface of the optical member through which the light is incident to the optical member from the light guide member;
      a second base film facing the display panel;
      a plurality of wavelength conversion patterns which are spaced apart from each other;
      a plurality of optical patterns which are disposed between the wavelength conversion patterns; and
      a reflective layer which is disposed between the first base film and the second base film and covers the wavelength conversion patterns,
   wherein the wavelength conversion patterns are spaced apart from the optical patterns with the reflective layer interposed therebetween, and
   wherein the light incident surface of the optical member having the optical patterns, the reflective layer and the wavelength conversion patterns is adjacent to the light guide member along a second direction orthogonal to the first direction.

* * * * *